United States Patent [19]

Phillips et al.

[11] 4,287,331

[45] Sep. 1, 1981

[54] IMPROVED METHOD OF PREPARING HIGH MOLECULAR WEIGHT POLYAMINES

[75] Inventors: Kenneth G. Phillips, River Forest; Paul J. Harris, Orland Park, both of Ill.

[73] Assignee: Nalco Chemical Company, Oak Brook, Ill.

[21] Appl. No.: 98,454

[22] Filed: Nov. 29, 1979

[51] Int. Cl.³ .............................................. C08G 73/02
[52] U.S. Cl. ..................................... 528/397; 525/540
[58] Field of Search ......................................... 528/397

[56] References Cited

U.S. PATENT DOCUMENTS 3,372,129  3/1968  Phillips .................................. 528/397

Primary Examiner—Harold D. Anderson
Attorney, Agent, or Firm—Hosier, Niro and Daleiden

[57] ABSTRACT

An improved process for synthesizing high molecular weight polyamines utilizing a self-limiting neutralizing agent to maintain a generally constant alkaline pH over the course of the synthesis reaction, and the improved high molecular weight polyamines produced thereby.

11 Claims, No Drawings

IMPROVED METHOD OF PREPARING HIGH MOLECULAR WEIGHT POLYAMINES

BACKGROUND OF THE INVENTION

The present invention relates to an improve method of preparing polyamines and the high molecular weight polyamine products obtained therefrom. More particularly, the present invention is directed to an improved process for making high molecular weight polyamines by reacting an amine and an alkylene dihalide in the presence of a self-limiting neutralizing agent which enables the reaction to run its course under generally constant alkaline pH conditions.

In many applications, the usefulness and efficiency of polyamines is directly related to the molecular weight and linearity of the polyamine molecule. Generally, it has been found that improvements or increases in such molecular characteristics as molecular weight and linearity are associated with superior polyamine activity. These molecular characteristics have been found to be especially significant in connection with the use of polyamines in the coagulation of suspended solids from water.

Since the significance of polyamine molecular weight and linearity are well recognized, it follows that those concerned with the synthesis of polyamines are most interested with discovering ways in which to enhance both of these characteristics.

Prior art methods of preparing polyamines by reacting lower amines with alkylene dihalides have exhibited a number of drawbacks. Some of these methods are capable only of producing polymer products of relatively low average molecular weight. Others of these methods can produce high molecular weight polymers, but require precise control and manipulation of the alkalinity of the reaction environment to avoid polymer degradation.

A good example of a method capable of producing high molecular weight polyamines under carefully controlled alkalinity conditions appears in U.S. Pat. No. 3,372,129 to Kenneth G. Phillips, one of the co-inventors of the present improved method of polyamine synthesis. The method of the U.S. Pat. No. 3,372,129 entails the reaction of ethylene and 1,2-propylene dihalides with amines in a reaction zone. This method requires that, during at least the terminal 60% of the time of reaction, sufficient basic reagent be introduced into the reaction zone to maintain the reaction pH between about 8.0 and 12.5.

Unfortunately, when polyamine synthesis is carried out on a commercial scale following the teaching of U.S. Pat. No. 3,372,129 or similar variable alkalinity methods, it is quite difficult if not impossible to maintain the pH in the desired range throughout the entire reaction mixture. Localized excesses and deficiencies in alkaline concentration occur due to non-uniform mixing and due to the necessary lag time between adding the basic reagent to the reaction mixture and measuring the pH. When pH falls below the desired range, the rate of polymerization slows or stops resulting in the production of low molecular weight polymers. Localized excesses of basic reagent, on the other hand, degrade the polymer already produced thereby reducing the average molecular weight of the end product.

It would therefore be of benefit to the art if a method were devised of synthesizing polyamines of higher molecular weight and enhanced linearity than was heretofore achieved by prior art techniques. Further important benefits would be obtained if this method eliminated the precise alkalinity control required in the practice of some of the prior art methods.

Since quaternary polyamines may be obtained by quaternizing polyamines, important benefits can be derived from the present invention in connection with the synthesis of polyquaternaries. The overall synthesis process will be improved by the practice of the present invention and the linearity and molecular weight of the end product enhanced.

Other objects and advantages of the present invention will appear hereinafter.

SUMMARY OF THE INVENTION

The present invention is directed to an improved process for making high molecular weight polyamines and quaternary polyamines. The method entails the reaction of an alkylene dihalide with an amine, in the presence of a self-limiting neutralizing agent.

The alkylene dihalide reactant may be chosen from a wide variety of difunctional organics. Preferred among these are ethylene dichloride and 1,2-propylene dichloride. The most preferred alkylene dihalide is ethylene dichloride.

The amine reactant may be described by the following structural formula:

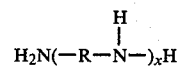

where x is an integer of 0–5 and R is an alkylene radical selected from the group consisting of:

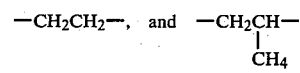

R, when present, is preferably an ethylene radical. Preferred reactants are ammonia, ethylene diamine, diethylene triamine, tetraethylene pentamine, and triethylene tetramine. Ammonia is the most preferable reactant, due to its excellent reactivity and low cost.

It is well recognized that the condensation reaction of an alkylene dihalide with an amine will produce an acid by-product. In order to maintain the condensation reaction and to keep the pH of the reaction mixture in the desired range of about 8.0–12.5, each equivalent of acid by-product thus produced must be neutralized by one equivalent of base. Since base is consumed in the neutralization, the pH of the overall reaction will drop as polymerization proceeds, usually requiring the addition of base to maintain the pH 8.0–12.5 range.

Furthermore, it has now been recognized that the activity of the endproduct will be enhanced if the reaction is carried out at the upper end of the pH 8.0–12.5 range, near pH 12.0. Unfortunately, this is not practical in prior commercial scale syntheses since an initial pH well in excess of pH 12.5 would be required resulting in degradation of the polymer as it is formed.

In the practice of the present invention, however, a self-limiting neutralizing agent is used. This agent is "self-limiting" in the sense that it has limited aqueous solubility and a $K_b$ which prevent the pH of the reaction mixture from rising above a generally constant pH value, no matter what the neutralizing agent concentration. Thus, for example, localized excesses of neutralizing agent concentration commonly experienced in commercial production of polyamines will not produce excessively high pH levels and resulting polymer degradation. Furthermore, as long as sufficient amounts of self-limiting neutralizing agent are present in the reaction mixture, the pH of the mixture will not vary significantly over the course of the reaction.

Preferred compounds which exhibit the desired solubility and dissociation properties are $Ca(OH)_2$ and $Mg(OH)_2$, which may be produced by dissolving CaO and MgO respectively in water. $Ca(OH)_2$ is presently considered the most preferred self-limiting neutralizing agent due to its ready availability and due as well to the fact that it will maintain the pH level at about 12.0 and produce a highly soluble by-product, $CaCl_2$. Other materials exhibiting these properties may be located by those skilled in the art by routine experimentation.

It should be pointed out that the method of the '129 patent which was discussed earlier suggests the use of a large number of basic reagents including alkali and alkaline earth metal hydroxides, oxides and carbonates, with the most preferred substances being potassium hydroxide, calcium hydroxide and sodium hydroxide. Among this very broad range of materials, it has now been discovered that calcium and magnesium hydroxides may be used as "self-limiting neutralizing agents" in the manner described herein. The other alkaline earth metal hydroxides, oxides and carbonates cannot be utilized in the practice of the present invention because they exhibit either excessive or insufficient solubilities and dissociation constants. In particular, it has been noted that the most preferred and most commonly used alkaline agent described in the '129 patent, sodium hydroxide, requires extremely careful control of addition to the reaction mixture and, even with such careful control, produces localized excesses of alkalinity resulting in polymer degradation. A further shortcoming of many of the alkaline earth metal hydroxides, oxides and carbonates described in '129 is that they produce salts of very limited aqueous solubility upon neutralizing the acid by-product thereby presenting serious filtration and disposal difficulties.

The present polymerization reaction should be carried out under carefully controlled environmental conditions. The temperature of the reaction should be confined to the range of about 75° to about 200° C., and the pressure should be kept in the range of 75–1,000 p.s.i. The polymerization reaction is more preferably carried out at temperatures from about 80° C. to 140° C., and under pressures ranging from about 75 p.s.i. to about 200 p.s.i. In such cases, the end products will have better clarity and less color than do those formed under less stringent reaction conditions.

The reaction may be carried out by placing the self-limiting neutralizing agent in the reaction vessel along with sufficient water to permit the overall polymerization to occur in the liquid phase. The amount of neutralizing agent should be at least a slight excess, based on the number of equivalents of acid by-product expected to be produced. Insufficient neutralizing agent will result in amine salt formation causing the polymerization to terminate prematurely to give reduced polyamine molecular weights. Following the introduction of the self-limiting neutralizing agent, a quantity of amine should be slowly introduced into the reaction zone at a rate sufficient to maintain a fixed pre-determined pressure within the desired limits whereupon simultaneous introduction of the alkylene dihalide is begun. The rate of alkylene dihalide introduction into the reaction zone must be sufficient to maintain a fixed pre-determined temperature within the desired limits.

Since the above-described reaction is an exothermic one, it is greatly preferred that a source of external cooling be applied to the reaction zone. This may be accomplished by encasing the reaction zone with a cooling jacket of water. However, whether or not external cooling is applied, the flow of alkylene dihalide must be adjusted to maintain the temperature substantially within the desired range. Cooling, therefore, permits a higher addition rate of the alkylene dihalide.

After the reaction vessel has been substantially filled with reaction product, the alkylene dihalide flow is ceased. Residual, unreacted alkylene dihalide is consumed by further reaction with the amine, preferably at the same temperature and pressure as previously employed. Excess amine present in the reactor is then removed. In an alternate embodiment, the amine flow is first ceased, and then additional alkylene dihalide added and reacted with the residual amine.

When the above steps and reaction parameters are adhered to, highly linear polymers of relatively high molecular weights are obtained. For example, the reaction of ammonia and ethylene dichloride according to the above directions will yield mixed polyamines having an average molecular weight in excess of 5,000, and in many cases in excess of 50,000.

An important advantage inherent in the present invention is that relatively highly concentrated polymer solutions may be formed, without precipitating the salt formed upon neutralization of the reaction acid by-product. This is highly desirable due to the filtration and disposal difficulties which arise with precipitated salts. Where, for example, $Ca(OH)_2$ is used as the self-limiting neutralizing agent, the resulting $CaCl_2$ salt is extremely soluble in water. Thus, it is possible to make, ship and use polyamine solutions containing active polymer concentrations in the range of 10–50%, without precipitating the $CaCl_2$ salt. It is preferred, in the practice of the present invention, that the active polymer concentration be set in the range of 15–25% by weight.

As noted earlier, it is highly desirable that water be introduced into the reaction vessel along with the self-limiting neutralizing agent from the beginning of the run. Water may be introduced independently or it may be introduced along with the neutralization agent and/or an aqueous amine solution. Generally, at least about 10% of the final total reaction product weight should be composed of water; a typical final solution will contain about 30–50% by weight water.

A highly preferred reaction mixture involves the use of ammonia, ethylene dichloride and $Ca(OH)_2$. In one specific embodiment, a heel of CaO and water are added to the reaction vessel which is then heated to the desired temperature. An aqueous solution of ammonia is added until the desired pressure is reached and while this temperature is maintained, ammonia and ethylene dichloride are metered in at a rate which permits the preset temperature and pressure to be maintained at a generally constant value. When the entire volume of the reaction vessel is filled with product, the reaction is terminated and the product withdrawn from the system.

Depending upon batch size, agitation, temperature and pressure, widely varying reaction times may be required. Generally, the present reaction will take from about one half to about 20 hours and most often from 1-12 hours to reach completion. It has been found that from approximately 1-2.5 and more generally 1-1.5 moles of amine are consumed during the reaction per mole of alkylene dihalide.

Polyquaternaries may be obtained by adding sufficient alkylating agent to the above described polyamines to completely quaternize the free amine groups of the polyamine. The amount of quaternizing agent necessary is easily determined by calculating the equivalent weight of the polyamine by known titration techniques, and then adding sufficient quaternizing agent to complete the reaction. In most instances, a slight excess of quaternizing agent is added in order to drive the reaction to completion. The quaternization reaction may be carried out in bulk, without the benefit of solvent or in a variety of polar organic media, such as alcohols, ketones, esters, etc.

The organic quaternizing agent may be chosen from a wide range of known organic alkylating agents. For example, dimethyl sulfate, $C_1$–$C_{22}$ alkyl halides such as methyl chloride, ethyl chloride, propyl chloride, etc., alkaryl halides such as benzyl chloride, substituted benzyl chlorides such as dodecyl benzyl chloride, epihalohydrins such as epichlorohydrin, lactones such as beta-propiolactone, polyoxyalkylene halides, such as polyoxyethylene chloride, etc. may be employed. Preferred quaternizing agents include alkyl halides, alkyl substituted aryl halo compounds such as alkyl substituted benzyl halides and alkoxy halides. Among the latter, benzyl chloride, methyl chloride and dodecyl benzyl chloride are most preferred.

The present polyamines and polyquaternaries are extremely useful as coagulants. Coagulation of suspended solids from aqueous media, for example, may be effected merely by adding the polyamines or polyquaternaries to the waste media at the desired concentrations. The suspended solids agglomerated by the action of these compounds are then separated from the suspending liquid by conventional techniques, such as gravity settling or filtration.

The present materials are useful in coagulating low turbidity water suspensions containing 15–30,000 ppm by weight of finely divided solids in an aqueous waste media. They are also useful in coagulating heavy slurry materials containing 7–70% by weight of suspended solids. Dosage levels may be as little as 7 ppm of polyamine or polyquaternary product in terms of active organic polymer. Preferably, dosages will range from 7 to about 1,000 ppm, with the most preferred range being 7–100 ppm.

The following examples are intended to illustrate the practice of the present invention. These examples are not intended to be exhaustive or limiting of the invention.

EXAMPLES

Example 1

95.0 grams of CaO were added to a 1 liter autoclave pressure reactor. The system was sealed and pressure checked and then 300 grams of deionized water were added. The reactor was then heated to 100° C. and liquid ammonia added until a pressure of 100 p.s.i. was reached.

The temperature of the reactor exothermed to 120° C. upon pressurization of the ammonia. This temperature was maintained while addition of 1,2-dichloroethane (EDC) was commenced at a rate of 1.1 ml/minute. Ammonia addition was also continued at a rate sufficient to maintain the reactor pressure between 80 and 100 p.s.i.

After addition of 88.7 grams of ammonia was completed, ammonia addition was stopped and the viscosity of the reaction monitored in order to insure that it remained at a workable level. The addition of EDC was continued until a viscosity of about 200 centipoise was reached, which occurred after 308 grams of EDC had been used.

The reactor was then cooled and vented. The product remaining in the autoclave was a viscous polymeric solution contaning small amounts of unreacted EDC. The solution pH was between 8 and 10. It was predicted that scale-up of this reaction procedure to commercial plant procedures would proceed without difficulty using lower reactor pressures within the earlier described ranges.

Example 2

A quaternized polyamine was prepared in accordance with the present invention as follows:

54.9 grams of CaO were added to a 1 liter autoclave pressure reactor followed by 400.0 grams of a polyamine produced in accordance with the procedure of Example 1 and 100.0 grams of water. Titration of the polymer indicated that 88.18 ml of methyl chloride would be required to completely quaternize the polyamine.

The mixture of CaO, polyamine and water was heated to 70° C. whereupon addition of methyl chloride was initiated. Methyl chloride addition was continued for about 5 hours whereupon the reaction vessel was cooled and vented. The extent of quaternization was later determined to be about 75%.

Example 3

Quaternization of polyamines produced in accordance with the present invention may be accomplished as follows:

Place a polyamine prepared in accordance with the present teaching in a 20 gallon glass-lined reactor along with 21 pounds of $Ca(OH)_2$. Raise temperature to 80° C. and add methyl chloride via a pressure regulator to 70–80 p.s.i. After approximately 7 hours and the addition of about 45 pounds of methyl chloride, the reaction will be complete, whereupon the reaction vessel may be cooled, vented and drummed for use.

Example 4

The coagulation activity of polyamines and polyquaternaries prepared in accordance with the directions of Examples 1 and 2 were compared with corresponding polyamines prepared in accordance with the teachings of U.S. Pat. No. 3,372,129. The comparisons were made using standard Kaolin jar tests. The results, reported below, indicate a significant improvement in polymer activity:

|  | Replacement Ratio Relative to '129 Material |
| --- | --- |
| Example 1 polyamine | 0.88 |
| Example 2 polyquaternary | 0.62 |

It is thus apparent that the present invention represents an important contribution to the art of preparing high molecular weight polyamines. This invention makes possible the preparation of polyamines exhibiting coagulation activities considerably in excess of prior art materials. The invention simplifies the synthesis of the polyamines and quaternaries derived therefrom by eliminating prior exacting requirements of base addition. The present invention makes possible the synthesis of superior polymer molecules by enabling reaction between amine and alkylene dihalides to be carried out at a constant level of high alkalinity without localized excesses of alkylene agent to degrade the polyamine end product.

While the present invention is described above in connection with preferred or illustrative embodiments, these embodiments are not intended to be exhaustive or limiting of the invention. Rather, the invention is intended to cover any alternatives, modifications, or equivalents that may be included within its spirit and scope, as defined by the appended claims. The present invention is therefore claimed as follows:

We claim:

1. An improved process for making high molecular weight polyamines comprising:
   reacting, in the presence of a self-limiting neutralizing agent, an alkylene dihalide selected from the group consisting of ethylene and 1,2-propylene dihalides with a nitrogen containing compound having the structural formula $$H_2N(-R-\underset{H}{\underset{|}{N}}-)_xH$$

where x is an integer of 0–5 and R is an alkylene radical selected from the group consisting of $$-CH_2CH_2-, \text{ and } -CH_2\underset{CH_3}{\underset{|}{CH}}-$$

to produce said polyamines and an acid by-product,
   said self-limiting agent being present at the outset of the reaction in an amount sufficient to neutralize substantially all of said acid by-product expected from the reaction,
   said self-limiting agent being a basic reagent with a sufficiently low aqueous solubility and $K_b$ for neutralizing said acid by-product as it is produced while maintaining the pH of said reaction at a generally constant alkaline value.

2. The process of claim 1 wherein said self-limiting neutralizing agent is chosen from the group consisting of $Ca(OH)_2$, and $Mg(OH)_2$.

3. The process of claim 1 wherein said self-limiting neutralizing agent is $Ca(OH)_2$ and said generally constant alkaline value is about pH 12.0.

4. The process of claim 1 wherein said reaction is carried out at a temperature ranging from 75° C. to 200° C. and under a pressure of 75–1,000 p.s.i. by slowly introducing said amine into a reaction zone containing a quantity of said self-limiting neutralizing agent at a rate sufficient to maintain a fixed pre-determined pressure within said limits and simultaneously introducing said alkylene dihalide into said reaction zone at a rate sufficient to maintain a fixed pre-determined temperature within said limits,
   said quantity of neutralizing agent being an amount in excess of the amount of acid by-product produced during said reaction.

5. The process of claim 1 wherein said alkylene dihalide is ethylene dichloride and said amine is ammonia.

6. The process of claim 5 wherein about 1–2.5 moles of ammonia are provided for reaction with each mole of ethylene dichloride.

7. An improved process for making high molecular weight polyamines comprising:
   reacting, in the presence of a self-limiting neutralizing agent, ethylene dihalide with ammonia to produce said polyamines and an acid by-product,
   said self-limiting agent consisting of $Ca(OH)_2$, said $Ca(OH)_2$ being present at the outset of the reaction in an amount sufficient to neutralize all of said acid by-product as it is produced while maintaining the pH of said reaction at a generally constant value of pH 12.0.

8. In a process for making high molecular weight polyamines by reacting an alkylene dihalide selected from the group consisting of ethylene and 1,2-propylene dihalides with an amine having the structural formula $$H_2N(-R-\underset{R}{\underset{|}{N}}-)_xH$$

where x is an integer of 0–5 and R is an alkylene radical selected from the group consisting of $$-CH_2CH_2-, \text{ and } -CH_2\underset{CH_3}{\underset{|}{CH}}-$$

to produce said polyamines and an acid by-product, the improvement comprising:
   carrying out said reaction in the presence of a self-limiting neutralizing agent, said self-limiting agent being present at the outset of the reaction in an amount sufficient to neutralize all of said acid by-product as it is produced,
   said self-limiting agent being a basic reagent with a sufficiently low aqueous solubility and $K_b$ for maintaining the pH of said reaction at a generally constant alkaline value.

9. The process of claim 8 wherein said neutralizing agent is $Ca(OH)_2$ and said generally constant alkaline value is about pH 12.0.

10. The process of claim 8 wherein said reaction is carried out at a temperature ranging from 75° C. to 200° C. and under a pressure of 75–1,000 p.s.i. by slowly introducing said amine into a reaction zone containing a quantity of said self-limiting neutralizing agent at a rate sufficient to maintain a fixed pre-determined pressure within said limits and simultaneously introducing said alkylene dihalide into said reaction zone at a rate sufficient to maintain a fixed pre-determined temperature within said limits,
   said quantity of neutralizing agent being an amount in excess of the amount of acid by-product produced during said reaction.

11. The process of claim 8 wherein said alkylene dihalide is ethylene dichloride and said amine is ammonia.

* * * * *